D. PUTNEY.
ANIMAL TRAP.
APPLICATION FILED AUG. 1, 1913.
1,116,482.
Patented Nov. 10, 1914.
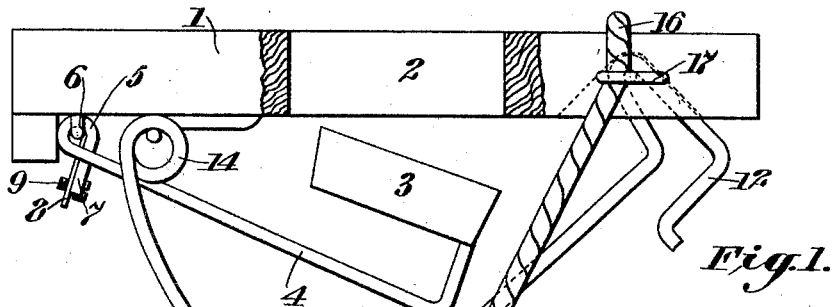
Fig. 1.
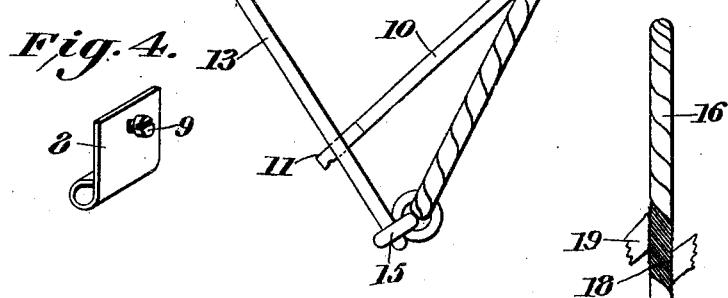
Fig. 4.
Fig. 2.
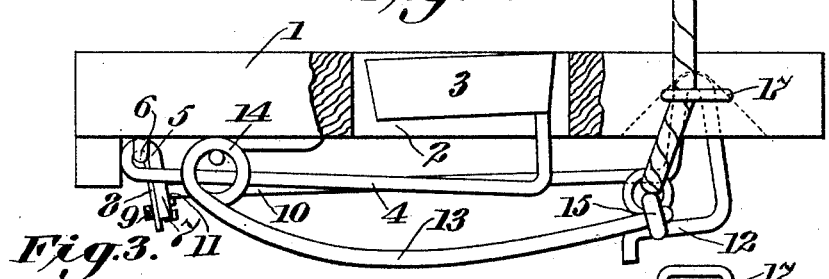
Fig. 3.
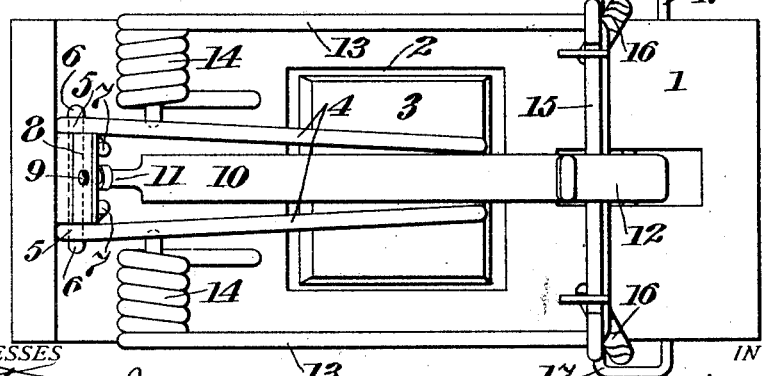
WITNESSES
INVENTOR
David Putney

UNITED STATES PATENT OFFICE.

DAVID PUTNEY, OF WEISER, IDAHO.

ANIMAL-TRAP.

1,116,482.  Specification of Letters Patent.  Patented Nov. 10, 1914.

Application filed August 1, 1913. Serial No. 782,510.

*To all whom it may concern:*

Be it known that I, DAVID PUTNEY, a citizen of the United States, residing at Weiser, in the county of Washington and State of Idaho, have invented a certain new and useful Improvement in Animal-Traps, of which the following is a full, clear, and exact description.

A main object of this invention is to provide a sensitive trap for light-footed, burrowing animals, such as gophers. Such animals are very wary, and traps for successful use against them must be inconspicuous, or else easily concealed. These conditions are fairly well understood, and the present invention is based upon a rather strict adherence to them.

The invention relates to the choker-type of traps, and consists of a choker loop that may be concealed with earth, combined with a sensitive trigger mechanism operated by contact of the animal, and adjustable to render it more or less sensitive, as I will proceed now more particularly to explain and finally claim.

In the accompanying drawings, illustrating the invention, in the several figures of which like parts are similarly designated, Figure 1 is a side elevation of the trap, not set, with the platform broken away to show the central opening therein for the trigger panel. Fig. 2 is a similar view of the trap but showing it in set position. Fig. 3 is a plan view of the trap set. Fig. 4 is a perspective view of the trigger catch.

The base or platform 1 may be of wood or other material, having a central opening 2 for the trigger panel 3. This panel carries the arms 4, which are provided with sockets 5 engaged by a pivot member 6 fastened to the platform, whereby the panel is pivotally or hingedly secured to said platform. The arms 4 terminate in fingers 7. Also pivoted to the member 6 is the trigger catch 8, in such relation to the fingers 7 as that when the panel is moved in one direction these fingers will push upon the catch and turn it upon its pivot. This catch is provided with an adjustable trigger-engaging element 9, which may be a screw readily adjustable in the catch to render its engagement of the trigger more or less sensitive.

The trigger 10 is pivotally mounted near the opposite end of the platform, and has a catch-engaging tip 11, at its free end, and a spring-engaging hook 12 at its other or pivot end.

The spring 13 is of loop-form, secured through the medium of its spring elements 14 to the platform at the catch end, and having a cross-bar 15 at the other end to be engaged by the trigger hook 12.

Connected with the bar end of the spring are the limbs of the choker 16, which extend thence through guides 17 across the opposite side of the platform. This choker loop is made of material to which earth may readily adhere, so that it may be concealed when the trap is set. For this purpose wire wrapped with textile or other fibrous material may be used. Referring to Fig. 2, 18 may indicate the wire and 19 the fibrous material.

When the trap is set, it is advisable to enlarge the mouth of the burrow sufficiently to receive the operative parts of the trap inverted as shown in Fig. 2; lightly cover the platform with earth, and smear earth about the choker loop, so that the trap may be concealed. In order to obliterate the smell of the trap, the burrow may be smoked.

The slightest pressure of an animal on the panel 3 will depress it and thereby cause its fingers to press upon the catch 8 and turn it upon its pivot and thus release the trigger and consequently the spring, the said spring acting upon the choker loop to violently draw it upon the animal.

By turning the screw 9 so as to cause it to project less or more in advance of the catch and thereby engage the trigger tip less or more extensively, the sensitiveness of the trap may be increased or diminished, thus adapting the trap for very light-weight as well as heavy-weight animals.

By the construction described, which, of course, is susceptible of variations, a very strong, efficient and quick-acting trap is provided, and one capable of economical production.

What I claim is:—

1. An animal trap, having a platform provided with an opening, a trigger panel, a trigger catch pivoted to the platform, arms on the panel pivoted to the platform adjacent to the catch and by which said panel is pivotally mounted on said platform and adapted to enter the opening therein when the trap is set, said arms having fingers arranged in operative relation to the catch to trip it, a trigger pivotally mounted near the opposite end of the platform and adapted to engage the catch, a choker loop, and a spring carrying the choker loop, said spring adapted to be engaged by the trigger when the trigger engages the catch.

2. An animal trap, having a platform provided with an opening, a trigger panel, a trigger catch pivoted to the platform and having an adjustable element with which the trigger immediately engages, arms on the panel pivoted to the platform adjacent to the catch and by which said panel is pivotally mounted on said platform and adapted to enter the opening therein when the trap is set, said arms having fingers arranged in operative relation to the catch to trip it, a trigger pivotally mounted near the opposite end of the platform and adapted to engage the catch, a choker loop, and a spring carrying the choker loop, said spring adapted to be engaged by the trigger when the trigger engages the catch.

3. An animal trap, having a platform provided with an opening, a trigger panel, a trigger catch pivoted to the platform, arms on the panel pivoted to the platform concentrically with the catch and by which said panel is pivotally mounted on said platform and adapted to enter the opening therein when the trap is set, said arms having fingers arranged in operative relation to the catch to trip it, a trigger pivotally mounted near the opposite end of the platform and adapted to engage the catch, a choker loop, and a spring carrying the choker loop, said spring adapted to be engaged by the trigger when the trigger engages the catch.

4. An animal trap, having a platform provided with an opening, a trigger panel, a trigger catch pivoted to the platform, arms on the panel pivoted to the platform adjacent to the catch and by which said panel is pivotally mounted on said platform and adapted to enter the opening therein when the trap is set, said arms having fingers arranged in operative relation to the catch to trip it, a trigger pivotally mounted near the opposite end of the platform and having a catch-engaging tip at its free end and a spring-engaging hook at its pivotal end, a choker loop, and a spring fixed to the platform at the same end as the catch and carrying the choker loop at its free end and adapted to be engaged at its free end by the hook of the trigger.

5. In an animal trap, of the spring-actuated choker type, a trigger, a trigger catch having an adjustable trigger-engaging element, and a trigger-actuating element including a pivotally mounted panel having its pivoting member extended to engage the catch and trip it when the panel is moved.

In testimony whereof I have hereunto set my hand this 28th day of July, A. D. 1913.

DAVID PUTNEY.

Witnesses:
  Jos. I. Gallagher,
  Lot L. Feltham.

---

Copies of this patent may be obtained for five cents each, by addressing the "Commissioner of Patents, Washington, D. C."